Dec. 5, 1950     J. E. RICHTER     2,532,786
HYDRAULIC ACTUATED STEERING FOR MOTOR-POWERED VEHICLES
Filed Sept. 20, 1949     2 Sheets-Sheet 2
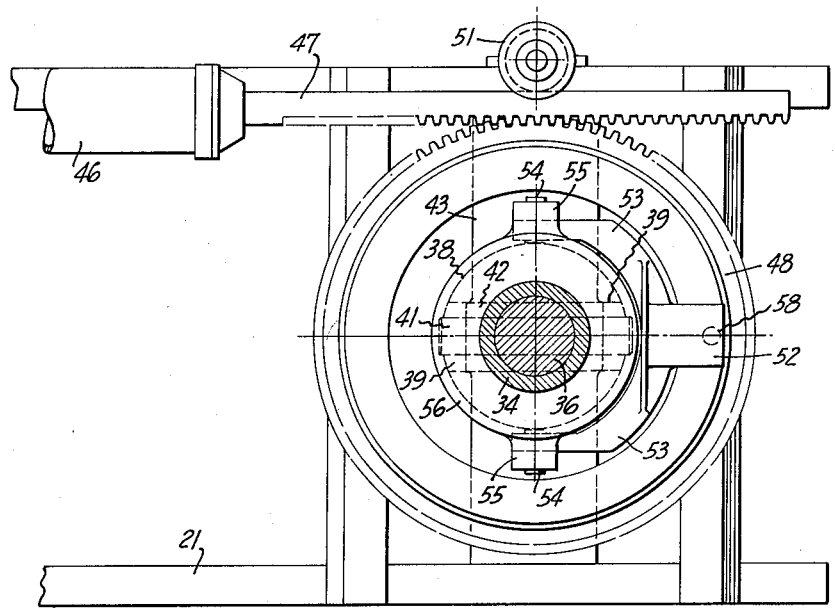
FIG_2_
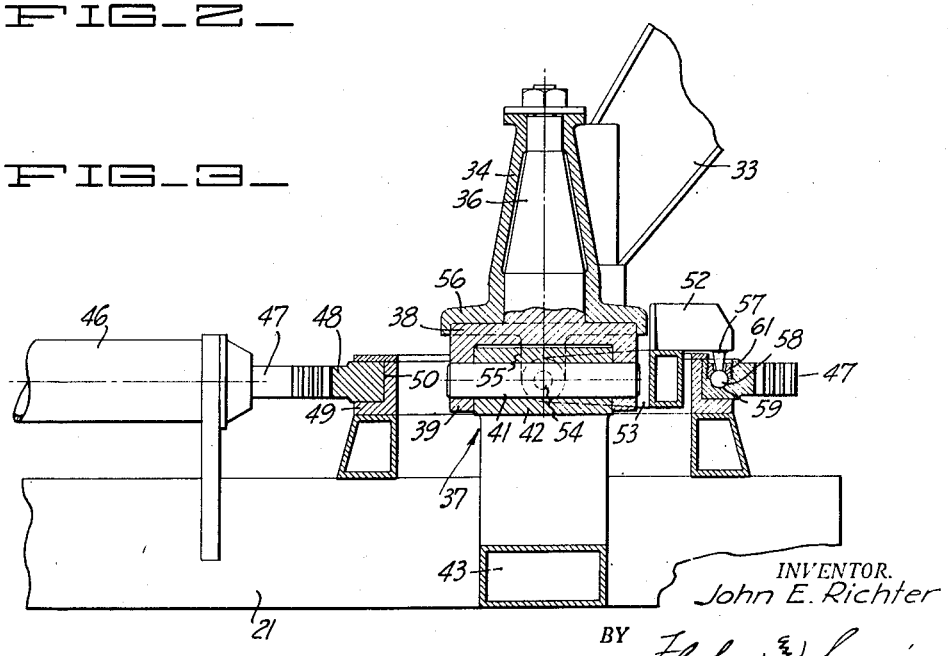
FIG_3_
INVENTOR.
John E. Richter
BY Fisher & Swain
ATTORNEYS Patented Dec. 5, 1950

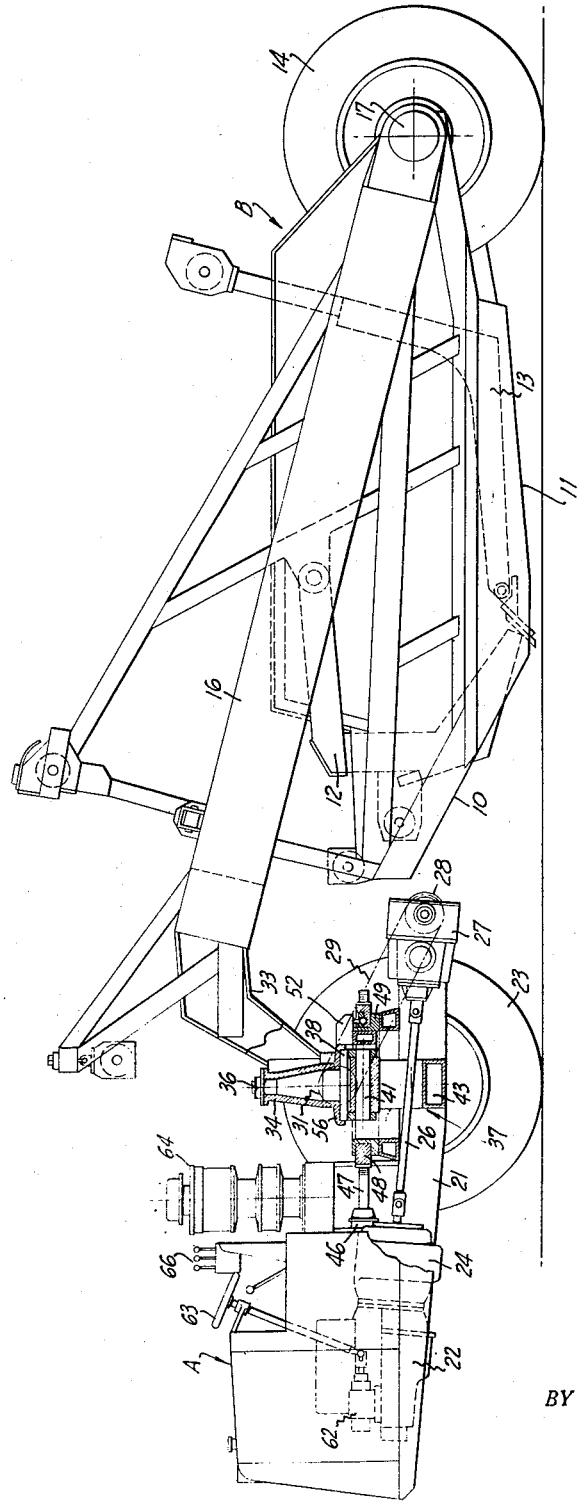

2,532,786

UNITED STATES PATENT OFFICE 2,532,786

HYDRAULIC ACTUATED STEERING FOR MOTOR-POWERED VEHICLES

John E. Richter, San Jose, Calif., assignor to Wooldridge Manufacturing Company, Sunnyvale, Calif., a corporation of Nevada Application September 20, 1949, Serial No. 116,724

3 Claims. (Cl. 180—79.2)

1

This invention relates generally to motor-powered vehicles of the heavy duty type adapted for the handling of relatively heavy loads.

It is a general object of the invention to provide improved steering apparatus for machines of the above character, and particularly steering apparatus making use of hydraulic means for the application of steering forces.

Another object of the invention is to provide steering apparatus capable of turning the tractor unit of the machine through a total angle of about 180° or more relative to the trailer frame.

Another object of the invention is to provide apparatus of the above character which is relatively simple in construction, and which permits use of a single double-acting hydraulic ram for applying the steering forces.

Additional objects of the invention will appear from the following description in which the preferred embodiment has been set forth in detail in conjunction with the accompanying drawing.

Referring to the drawing:

Figure 1 is a side elevational view of a scraper or earth mover incorporating the present invention.

Figure 2 is a plan view in detail of the steering mechanism.

Figure 3 is a section along the line 3—3 of Figure 2.

As illustrated in the drawing (Figure 1) the vehicle illustrated consists of a tractor unit A, together with the trailer unit B. The trailer unit illustrated is in the form of a scraper adapted to dig, carry and discharge earth. As illustrated it includes the main frame 10, the digging and carrying main bowl 11, a front apron 12 for the main bowl, and a hinged bottom 13 or expeller. The rear end of this structure carries ground engaging wheels 14, and the forward end of the scraper is attached to the truck unit A by the use of a means which will be presently described.

The main frame 10 is in the form of a yoke, having side arms 16 extending along the sides of the main bowl and pivotally secured to the main bowl at 17. Operating cables are connected to the forward end of the main bowl 11, to the expeller 13, and to the front apron 12, as described in Patent 2,318,190, to operate these parts during operation of the machine.

The tractor unit A consists of a frame 21 which carries the driving motor 22. The motor is connected to the wheels 23 through the driving gears and clutch 24, the rearwardly extending drive shaft 26, and the differential 27. The differential drives sprockets 28 which are connected by driving chains 29 with the sprockets 31. Sprockets 31 are suitably journaled to the frame and serve to rotate pinions which in turn drive ring gears carried by the wheels 23. The wheels are mounted upon stud shafts aligned on an axis extending laterally of the frame.

The main frame of unit B has a forward extension 33 by means of which the trailer is coupled to the tractor. Thus extension 33 is provided with a hub 34 which serves to journal the upright kingpin 36. A cradle connection 37 establishes attachment between the lower end of pin 36 and the frame 21 of the tractor unit, whereby the tractor can oscillate about a horizontal axis. Thus the lower end of kingpin 36 is secured to the plate 38, and the forward and rear ends of this plate carry depending ears 39 which form journals for the horizontal pivot shaft 41. Between the ears 39 the shaft 41 engages a bolster 42 carried by the rigid crossbeam 43 of the frame 21. With this connection between the kingpin and the frame, the motor unit A is free to oscillate about the generally horizontal axis of pin 41, while at the same time the kingpin may turn to permit steering movement of the tractor.

To apply steering forces between the tractor and the frame of the trailer, I provide a hydraulic operator or ram 46, the cylinder of which is firmly mounted upon the frame of the tractor. This hydraulic ram is of the double-acting type, and its piston rod is attached to the gear rack 47. The teeth of the rack 47 engage the ring gear 48, which is normally disposed in a horizontal plane coincident with the axis of the pin 41. Suitable means is provided for forming a journal mounting for the ring 48 on the frame of the tractor. Thus an annular journal 49 is provided for this purpose, and forms an annular recess 50 within which the ring gear is retained. A backing roller 51 is shown engaging the rack 47 and is journaled to the tractor frame.

The means employed for interconnecting the ring gear 48 with the frame of the trailer, for applying the steering forces, includes a so-called steering arm 52. This arm is forked to provide the side branches 53, which in turn are pivotally attached at 54 to the depending ears 55. These ears are mounted upon the sides of a flange 56, which is formed as a part of the hub 34. The pivots 54 are on a common horizontal axis which substantially intersects both the axis of the pin 41 and the vertical axis of kingpin 36.

The free end of the arm 52 is provided with a depending stud 57, having its end 58 formed as a ball for operating in the socket 59. The socket is formed within the body of the ring gear 48, whereby limited universal movement is permitted between the arm and the ring gear about a point located approximately in the medial plane of the gear. It will be noted that this is likewise the plane passing through the axis of the pivotal connection 54, and coincident with the axis of pin 41. Member 61 forms suitable means for locking the ball 58 within its socket.

Conventional hydraulic means can be utilized for applying and exhausting the liquid from the opposite ends of the hydraulic ram 46. This system can include the usual hydraulic control valve 62, which can be operated by the steering wheel 63. The remainder of the hydraulic system includes a high pressure pump which can be operated by the motor 22, and which serves to supply liquid to the hydraulic ram at a proper rate for movement of the rack 47 in opposite directions.

To facilitate operating various parts of the scraper, the tractor unit A is shown provided with a multidrum winch unit 64, the operation of which is controlled by the pneumatic control valve 66. Cables engaging the drums of the winch unit 64 extend rearwardly to the various parts of the scraper.

Operation of my vehicle is as follows: Figure 2 illustrates the positioning of the parts of the steering arrangement for straight ahead movement of the vehicle. The intermediate portion of the rack 47 engages the gear 48. The tractor unit is free to oscillate about the pivotal axis of pin 41, in passing over uneven ground. When the hydraulic ram 46 is operated to turn the tractor unit to the right or to the left, movement of the rack 47 causes rotation of the ring gear 48 relative to the frame of the tractor, and because of the operative connection between the ring gear and the arm 52, such movement of the ring gear 48 results in steering movement of the tractor relative to the frame of the trailer. When in various positions other than straight ahead position, the tractor is free to oscillate about the axis of the pin 41, without affecting the steering position. In other words such oscillating movements do not change the steering angle, with the result that the turning radius of the machine remains the same during such oscillating movements, and shock stresses are not applied to the steering arrangement as would be the case if oscillating movements modified the steering angle. Oscillating movements are accommodated in any steering position, without affecting the steering angle, because of the floating action of the steering arm 52, or in other words because this arm is free to move in a vertical direction about the axis of the pivotal connections 54. Likewise the fact that the center of the ball 58 is located in alignment with the axis of pin 41, contributes to this result.

It will be evident from the foregoing that I have provided a relatively simple mechanism for applying steering forces between the tractor and trailer units, and this mechanism is relatively rugged and is capable of applying the relatively heavy steering forces required, and also the severe shock stresses to which such mechanism is necessarily subjected. Because the ring gear 48 is free to turn through 180° or more, the steering angle each side of straight ahead position is not limited to less than 90°, as is the case with many prior art types of machine. It is understood by those skilled in the art that a wide steering angle is advantageous with heavy duty motor-powered machines, such as earth moving scrapers. With the arrangement described it is evident that the total steering movement can be through 180° or more.

I claim:

1. In a vehicle of the character described, a motor-powered tractor unit having a main frame, a trailer unit having a forward frame extension, an upright kingpin journaled to said extension, a pivotal connection between the lower end of the kingpin and the frame of the tractor for oscillating movement of the tractor about a horizontal axis longitudinal of the tractor frame, a ring gear rotatably mounted upon the tractor frame and concentric with the kingpin axis, a steering arm pivotally attached to the frame extension for vertical movements about a lateral horizontal axis which intersects and is at right angles to the kingpin axis, means forming a pivotal connection between the free end of the steering arm and said ring gear, a gear rack engaging the teeth of the ring gear, and means mounted upon the tractor frame for reciprocating said gear rack.

2. In a vehicle of the character described, a motor-powered tractor unit having a main frame, a trailer unit having a forward frame extension, an upright kingpin journaled to said extension, a connection between the lower end of the kingpin and the frame of the tractor for oscillating movement of the tractor about a horizontal axis extending longitudinally of the tractor, a ring gear rotatably mounted upon the tractor frame and concentric with the kingpin axis, a steering arm pivotally attached to the forward frame extension for vertical movements about a lateral horizontal axis which intersects and is at right angles to the kingpin axis, said last named axis being in a common plane with the axis of the pivotal connection between the kingpin and the frame of the tractor unit, means forming a pivotal connection between the free end of the steering arm and said ring gear, the medial plane of the ring gear being coincident with the axis of the pivotal connection between the kingpin and the tractor frame, said pivotal connection between the ring gear and said steering arm being likewise in said plane, a gear rack engaging said ring gear, and means mounted upon the tractor frame for effecting reciprocation of said gear rack to rotate the ring gear.

3. A vehicle as in claim 1 in which said last named means comprises a double acting hydraulic ram.

JOHN E. RICHTER.

REFERENCES CITED

The following references are of record in the file of this patent:

UNITED STATES PATENTS

| Number | Name | Date |
|---|---|---|
| 2,362,262 | French | Nov. 7, 1944 |
| 2,368,202 | Clark | Jan. 30, 1945 |